(12) United States Patent
Goossen

(10) Patent No.: US 7,760,412 B2
(45) Date of Patent: Jul. 20, 2010

(54) MECHANICALLY-ACTIVE ANTI-REFLECTION SWITCH (MARS) MODULATOR WITH WIDE ANGLE TOLERANCE

(75) Inventor: Keith Goossen, Howell, NJ (US)

(73) Assignee: University of Delaware, Newark, DE (US)

( * ) Notice: Subject to any disclaimer, the term of this patent is extended or adjusted under 35 U.S.C. 154(b) by 562 days.

(21) Appl. No.: 11/368,899

(22) Filed: Mar. 6, 2006

(65) Prior Publication Data

US 2006/0203321 A1 Sep. 14, 2006

Related U.S. Application Data

(60) Provisional application No. 60/659,750, filed on Mar. 8, 2005.

(51) Int. Cl.
*G02F 1/03* (2006.01)
(52) U.S. Cl. .................... 359/245; 359/290
(58) Field of Classification Search ............ 359/245
See application file for complete search history.

(56) References Cited

U.S. PATENT DOCUMENTS

| | | | |
|---|---|---|---|
| 5,500,761 A | 3/1996 | Goossen et al. | |
| 5,589,974 A | 12/1996 | Goossen et al. | |
| 5,654,819 A * | 8/1997 | Goossen et al. | ............. 359/291 |
| 5,949,571 A | 9/1999 | Goossen et al. | |
| 6,445,502 B1 | 9/2002 | Islam et al. | |
| 6,611,366 B2 | 8/2003 | Islam | |
| 2004/0222418 A1 * | 11/2004 | Mochizuki | .................... 257/59 |

OTHER PUBLICATIONS

Aratani, K. "Process and Design Considerations for Surface Micromachined Beams for a Tuneable Interferometer Array in Silicon"; Proc. IEEE Microelectromech Workshop, Ft. Lauderdale, Florida; Feb. 7-10, 1993; pp. 230-235.
Solgaard, O. "Deformable Grating Optical Modulator"; Optics Letters; vol. 17, No. 9; May 1, 1992; pp. 688-690.

* cited by examiner

*Primary Examiner*—Jordan M. Schwartz
*Assistant Examiner*—James C Jones
(74) *Attorney, Agent, or Firm*—McCarter & English

(57) ABSTRACT

A modulator for modulating an optical signal is disclosed having a substrate, a support mounted to the substrate, and membrane attached to the support and defining an airgap between the substrate and the membrane. The membrane has at least three layers including a central layer having an index of refraction which is the square root of the index of refraction of the substrate. The thickness of the layers and the size of the airgap are optimized to maximize differential reflectivity of light incident on the membrane at a non-normal angle of incidence to the membrane when the membrane is either in an unbiased state or biased state. In one embodiment, the first, central, and third layers have corresponding thicknesses approximately equal to one-quarter, one-quarter, and on-half of a wavelength of the optical signal, respectively. In another embodiment, the thickness of the layers and the airgap are designed according to formulas such that the modulator can operate over wider angles of incidence up to about 55 degrees. In a third embodiment, the modulator can operate at an angle of incidence-up to about 85 degree with TE-only polarization of the incident light.

19 Claims, 15 Drawing Sheets

MECHANICALLY-ACTIVE ANTI-REFLECTION SWITCH (MARS) MODULATOR WITH WIDE ANGLE TOLERANCE

CROSS-REFERENCE TO RELATED APPLICATIONS

This application claims the benefit of U.S. provisional patent application No. 60/659,750 filed Mar. 8, 2005, the disclosure of which is incorporated herein by reference in its entirety.

RELATED FEDERALLY SPONSORED RESEARCH

The work described in this application was sponsored by the Office of Naval Research under Contract Number N000140310490.

FIELD OF THE INVENTION

The present invention relates to optical modulators, and more particularly to micro-mechanical optical modulators that provide effective modulation over a wide angle-of-incidence.

BACKGROUND OF THE INVENTION

Inexpensive light modulators that have high contrast and wide optical bandwidths have been used in optical wavelength-division-multiplexing networks. A modulation device particularly well suited for the above application is a surface normal mechanically-active an-reflection switch (MARS) modulator. This device may be described as having a variable air gap defined by two layers of material. Typically, surface normal MARS modulators operate by changing the amount of light reflected in the surface normal direction, i.e., the direction normal to the substrate surface. This may be achieved by varying the variable air gap, which alters the optical properties of the device.

One such MARS modulator has been described by Aratani et al. in "Process and Design Considerations for Surface Micromachined Beams for a Tuneable Interferometer Array in Silicon," Proc. IEEE Microelectromech. Workshop, Ft. Laud., Fla., Feb. 7-10, 1993 at 230-35. This article, and all other articles referenced in this specification are herein incorporated by reference in their entirety. Aratani's modulator is described as having a diaphragm mirror consisting of a polysilicon/silicon nitride multilayer supported by thin beams over a substrate, also partially mirrored by a polysilicon/silicon oxide multilayer. As a voltage is applied between the membrane and the substrate, the membrane is pulled toward the substrate. While a large change in reflectivity is supposedly achieved, the optical bandwidth of the optical resonator based modulator is limited. The contrast ratio of such a device falls off sharply as the wavelength of the incident light varies from the resonant wavelength of the device.

A second MARS modulator was described by Solgaard et al. in "Deformable Grating Optical Modulator," Optics Lett. 17(9) 688-90 (1992). This modulator was described as having a reflection phase grating of silicon nitride beams that is coated with metal and suspended over a substrate coated with metal. An air gap separates the grating and substrate. The deformable grating optical modulator described in Solgaard et al. does not achieve a low reflectivity state. Rather, it switches to a diffracting state. In the diffracting state, incident light is scattered into higher-order diffraction modes of the grating, so that the amount of light reflected into the zero order (surface-normal) mode is minimized. Such diffraction may be an undesirable aspect of the deformable grating optical modulator. If the numerical aperture of the incoming fiber or detection system is large enough to pick up the higher order diffraction modes, a degradation in contrast will result. Further, if this device is implemented in a system using arrays of optical beams or fibers, a significant crosstalk may be introduced.

U.S. Pat. No. 5,500,761 to Goossen (the Goossen '761 patent) describes a non-contacting MARS modulator which provides high contrast modulation for optical signals over broader range of wavelengths. More particularly, the modulator of the Goossen '761 patent describes a device comprising a membrane containing a layer whose refractive index is nearly the square root of that of the substrate, and whose thickness is a quarter of a wavelength of the light (as measured in the layer). Subsequent U.S. Pat. Nos. 5,589,974 and 5,654,819, both to Goossen (the Goossen '974 and '819 patents) describe further embodiments of the device described in the Goossen '761 patent. The Goossen '761, '974, and '819 patents are incorporated herein by reference in their entirety. In one embodiment described in the Goossen '819 patent, the membrane consists of three or more layers suspended over a substrate by support arms. There is a specific relationship between the refractive indices of the membrane layers and the refractive index of the substrate, and the membrane layers have specific thickness. The gap between the membrane and the substrate in the biased state is $\lambda/4$ and the air gap 20 between the unbiased membrane 15 and the substrate 10 ranges from about $0.65\lambda$ to about $0.7\lambda$ (Column 5, Line 40 to Column 6, Line 5).

All the MARS devices so far described are concerned with operation with substantially surface-normal (perpendicular) light (as they were primarily concerned with fiber optical modulation). For free space communications, there is a need for a MARS modulator that can be optimized to operate over a wide range of angles of incidence at a specific frequency. Solid state semiconductor modulations, such as those made from indium phosphide, have been suggested for use in free space communications. The main drawback of such devices is their expense, which can be up as much as 250 times the cost of standard MARS optical modulators.

SUMMARY OF THE INVENTION

In order to overcome the disadvantages and shortcomings of the prior art discussed above, the invention is directed to a modulator for modulating an optical signal comprising:

a substrate; a support mounted to the substrate; a membrane attached to the support and defining an airgap between the substrate and said membrane, the membrane having a central layer of a first thickness and the airgap having a second thickness, wherein the first and second thicknesses are optimized to allow reflection of light incident on the membrane at a non-normal angle of incidence to the membrane when the membrane is unbiased; and means for applying a bias voltage between the membrane and the substrate, wherein the bias voltage deforms the membrane from a first position to a second position, and reduces the second thickness so as to allow the light to pass through said membrane. The central layer has a refractive index which is approximately equal to the square root of the refractive index of the substrate. The membrane can further comprises at least three layers including the aforementioned central layer; a first layer proximal to the substrate and attached to the central layer, the first layer having a refractive index which is approximately equal to the refractive index of the substrate; and a third layer distal to the substrate and attached to the central layer, the third layer having a refractive index which is approximately equal to refractive index of the substrate.

In one embodiment, the first layer has a thickness approximately equal to one-quarter of a wavelength of the optical signal, as measured within the first layer; the central layer has a thickness approximately equal to one-quarter of a wavelength of the optical signal, as measured within the second layer; and the third layer has a thickness approximately equal to one-half of a wavelength of the optical signal, as measured within the third layer. The airgap is designed to have its unbiased position at approximately $(3\lambda/4)/\cos(\theta)$, wherein $\lambda$ is the basis wavelength of light incident on said membrane, and wherein $\theta$ is the angle of incidence of said light from the normal to the plane of the substrate, and said second position at approximately $(\lambda/2)/\cos(\theta)$. $\theta$ is chosen for maximum differential reflectivity that is approximately at the mid-point between zero degrees and said maximum angle of incidence. This embodiment works best for angles of incidence up to about 40°. In another embodiment, the modulator can operate over a range from about zero degrees and about 55°. In this embodiment, the first layer has a thickness approximately given as a fraction of the wavelength of the incident light by the formula $\frac{1}{4}+(x-1)5/4$ where x is 1/cos(maximum angle of incidence); the central layer has a thickness approximately given by the formula $\frac{1}{4}-[(x-1)-(x-1)^3]/2$; the third layer has a thickness approximately given by the formula $\frac{1}{2}-[(x-1)-(x-1)^5]/4$; and the airgap has a thickness approximately given by the formula $0.72+(x-1)/4$. In still another embodiment, the modulator is capable of operating over a range of angles of incidence up to about 85 degrees and TE polarization, wherein the first layer has a thickness of approximately $0.0226\lambda$ where $\lambda$ is the wavelength of the incident light, the central layer has a thickness of approximately $0.0710\lambda$; the third layer has a thickness of approximately $0.1323\lambda$; and the airgap has a thickness of approximately $0.1161\lambda$.

BRIEF DESCRIPTION OF THE DRAWINGS

For a more complete understanding of the present invention, reference is made to the following detailed description of several exemplary embodiments of the present invention considered in conjunction with the accompanying drawings, in which:

FIGS. 14-17b show successively the formation of the modulator of FIG. 13, where FIGS. 14, 15, 16a and 17a are side views, and FIGS. 16b and 17b are plan views;

Further features and advantages of the invention will appear more clearly on a reading of the following detailed description of several exemplary embodiments of the invention.

DESCRIPTION OF EXEMPLARY EMBODIMENTS

The present invention provides an apparatus for modulating an optical signal, and a method for its fabrication. The apparatus, which may be formed on a semiconductor wafer or chip, comprises a membrane and a substrate spaced to form an air gap. The membrane consists of three or more layers suspended over the substrate by support arms. There is a specific relationship between the refractive indices of the membrane layers and the refractive index of the substrate, and the membrane layers have specific thickness. A bias voltage is applied to the membrane and the substrate to generate an electrostatic force to move the membrane towards the substrate.

When the air gap is in the unbiased state, the membrane and air gap function as a high reflectivity coating. When the air gap is in the biased state, the membrane and air gap function as an anti-reflection coating. The membrane's change in reflectivity facilitates modulating the optical signal. In a preferred embodiment, the membrane does not contact the substrate under the action of bias.

In one embodiment, the apparatus may be fabricated by providing a conductive substrate and forming a three-layer conductive membrane on the substrate so that an air gap is defined between the membrane and the substrate.

Figure 1:
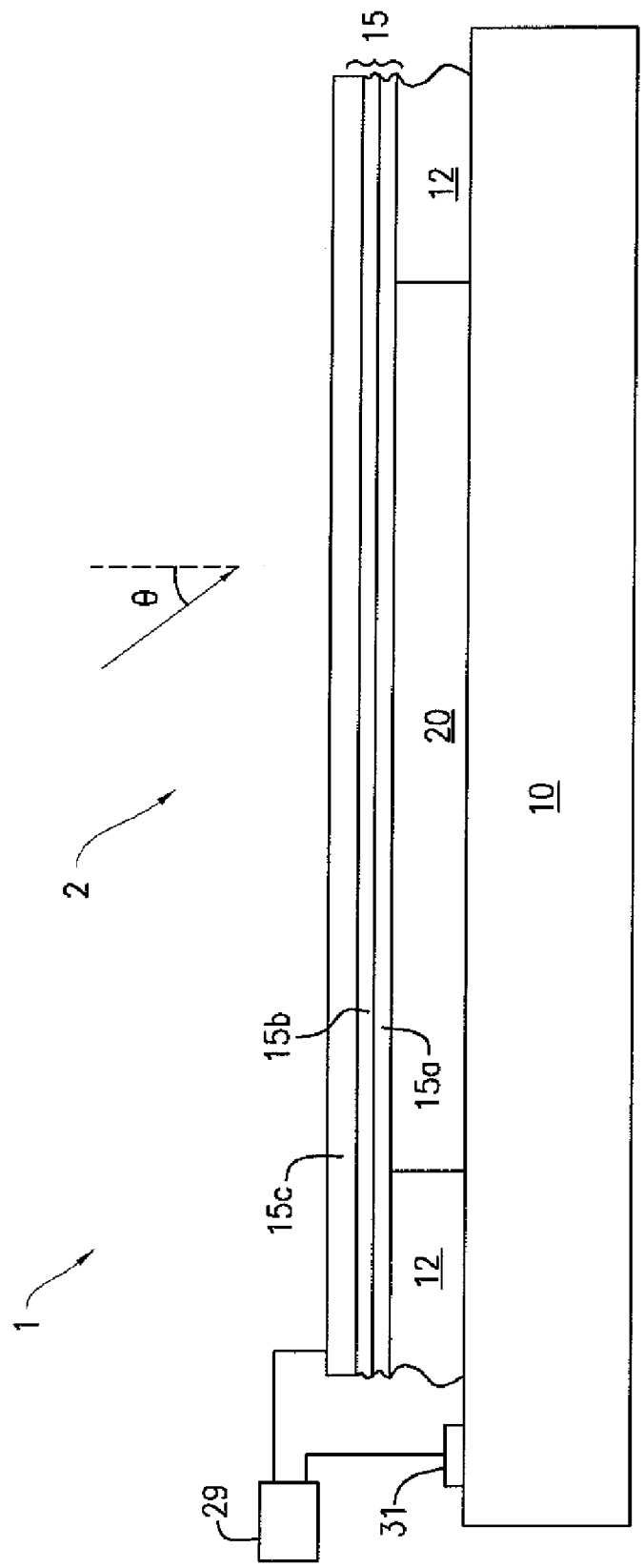
FIG. 1 is a side view of an embodiment of a MARS modulator according to the present invention where the modulator is shown in its unbiased position.
Figure 2:
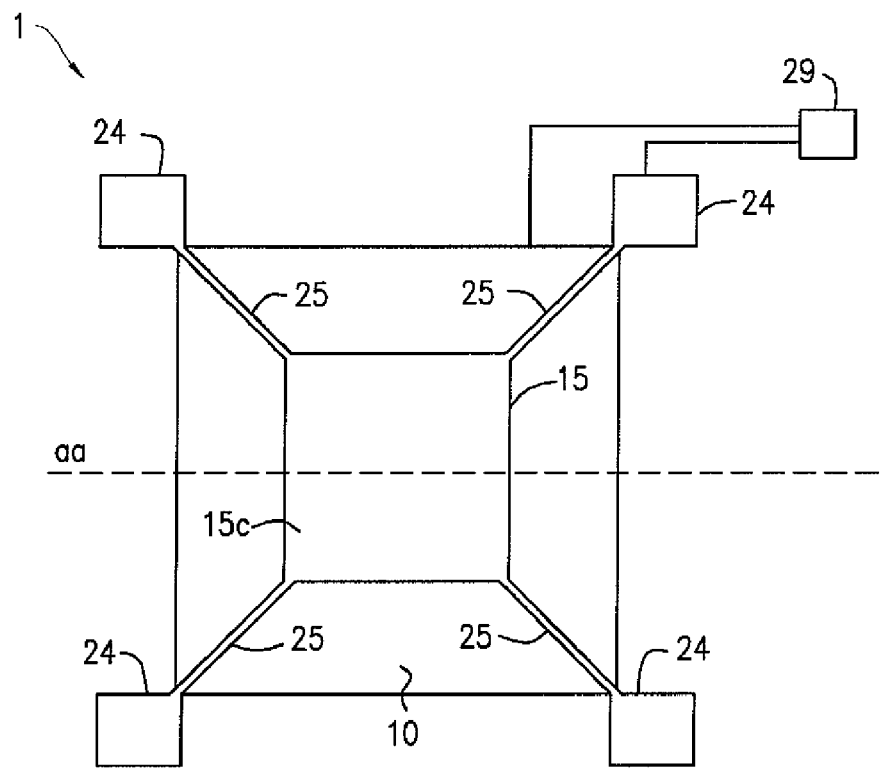
FIG. 2 is a plan view of the MARS modulator of FIG. 1.
Figure 2A:
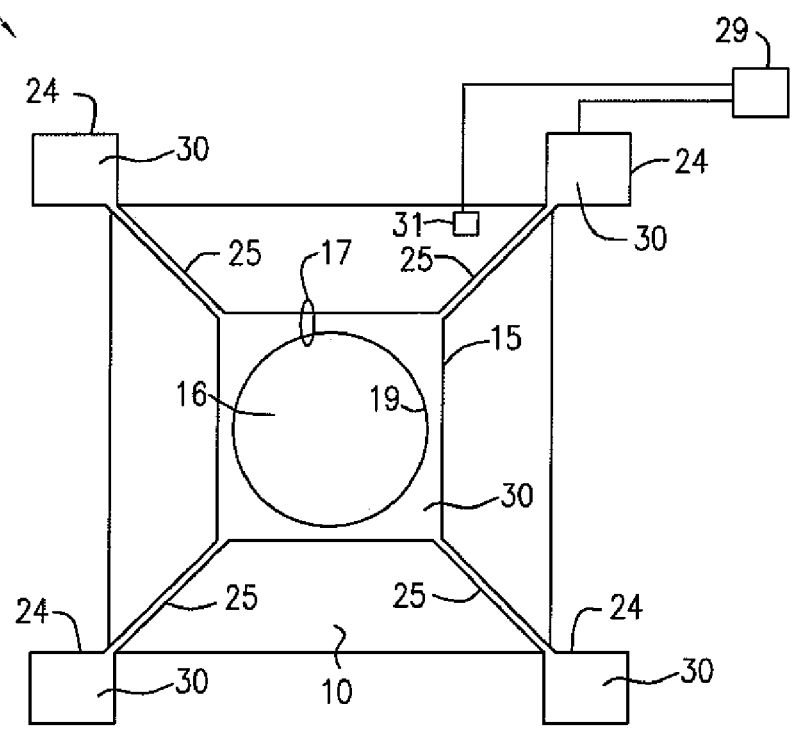
FIG. 2a is a plan view of a second embodiment of a MARS modulator according to the present invention wherein a conductive layer is deposited on top of the membrane and support arms.

FIGS. 1 and 2 show a preferred embodiment of a MARS modulator 1 according to the present invention. As shown in FIG. 1, which is a cross-sectional view through line aa in FIG. 2, the device comprises a substrate 10 and a membrane 15 having three layers, such as layers 15a, 15b and 15c. The membrane 15 and substrate 10 are spaced from each other defining an air gap 20. As shown in FIG. 2, which is a plan view of the apparatus of FIG. 1, the membrane 15 is suspended over the air gap 20 by support arms 25. The substrate and the layers 15a or 15c should be suitably conductive so that a voltage may be applied across the membrane 15 and the substrate 10 to generate an electrostatic force to move the membrane towards the substrate. The voltage may be supplied by a controlled voltage source 29. If neither the substrate 10 nor any of the layers comprising the membrane 15 are conductive, electrodes should be provided. For example, as shown in FIG. 2a, an electrode 30 comprising a layer of conductive material may be disposed on the membrane. If the substrate is non-conductive, an electrode may be formed in the substrate by doping the substrate with suitable materials, such as, without limitation boron, phosphorus and antimony. Doping methods include ion implantation, selective diffusion and other methods known to those skilled in the art. The devices 1 and 1a as depicted in FIGS. 2 and 2a, respectively, may be suitably formed on a semiconductor chip or wafer.

Preferably, the substrate 10 is formed of a conductive material, which is either transparent or absorbing over the operating optical bandwidth. Suitable substrate materials include, but are not limited to, silicon, gallium arsenide, indium phosphide, germanium or indium tin oxide (ITO) coated glass. If a semiconductor material is used for the substrate, it should preferably be appropriately doped. For example, if the substrate is silicon, it is preferably doped with any Group III or Group V element, typically phosphorus or boron. Such doping is expected to enhance device speed.

The membrane 15 shown in FIGS. 1 and 2 is comprised of the layer 15b of material which is characterized as having a refractive index which is approximately equal to the square root of the refractive index of the substrate 10. The layer 15b functions as a reflection/anti-reflection layer as will be described below. Suitable materials for the layer 15b include, without limitation, silicon oxide, or, more preferably, silicon nitride. The membrane 15 is also comprised of the layers 15a and 15c. These layers are characterized by a refractive index which is approximately equal to the refractive index of the substrate 10. The layers 15a and 15c will typically be formed of the same material as the substrate 10, preferably silicon. If silicon is used for the layers 15a and 15c, it may have a polycrystalline structure, such as polysilicon, or it may have an amorphous or single crystal structure.

In a first preferred embodiment of layer/airgap thicknesses of the present invention, the thickness of the layers 15a and 15b of the membrane 15 is preferably about one-quarter of a wavelength (as measured in the material comprising the layer) of an incident optical beam 2, which forms an oblique angle θ with the normal to the plane of the membrane 15. The layer 15c is preferably about one-half of a wavelength (as measured in the material comprising the layer) of the incident optical beam 2. Where the incident optical beam 2 is characterized by a single wavelength the membrane thickness is readily determined.

Figure 3:
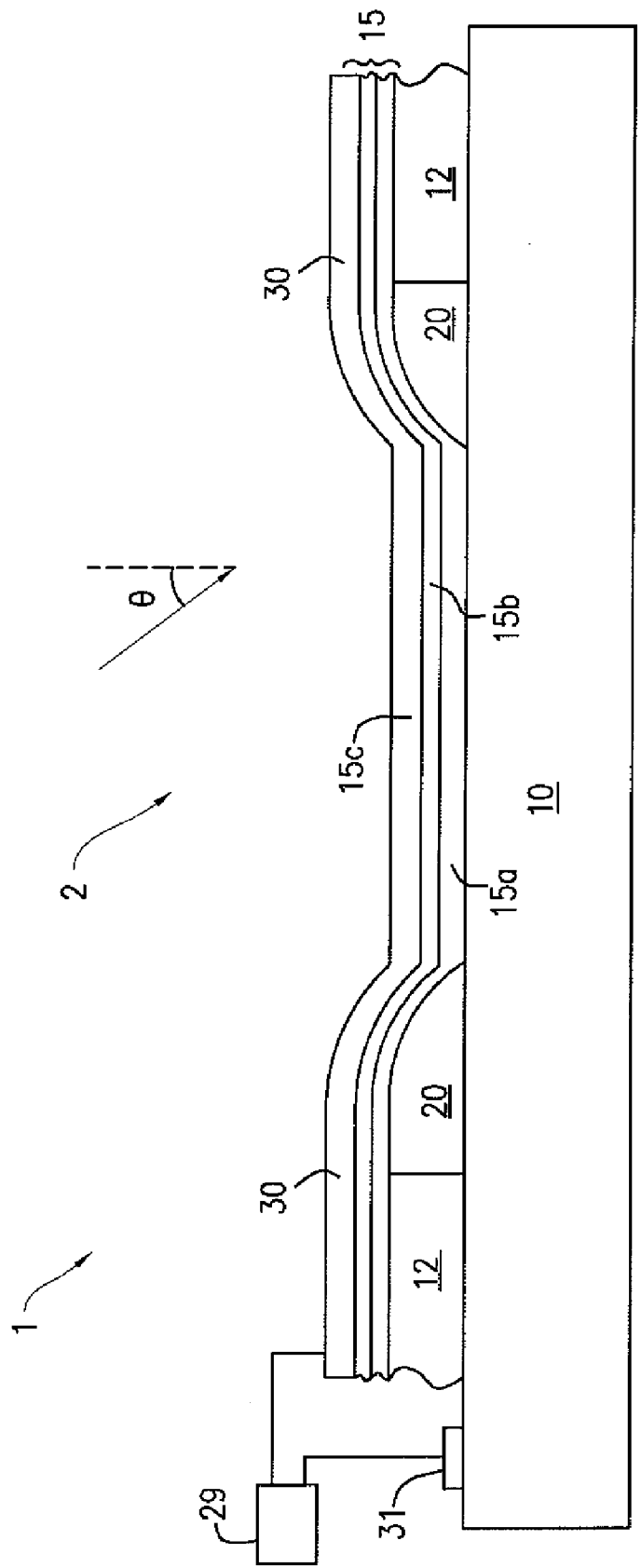
FIG. 3 is a side view of the modulator of FIG. 1 under bias.

The height of the air gap 20, i.e., the distance between the membrane 15 and substrate 10, is preferably about $(3\lambda/4)/\cos(\theta)$ the basis wavelength $\lambda$ in the un-biased position, and the thickness of the biased gap is preferably about $(\lambda/2)/\cos(\theta)$ the basis wavelength $\lambda$, where θ is a fixed angle of incidence. When the air gap 20 in the unbiased position is about $(3\lambda/4)/\cos(\theta)$ of the basis wavelength, the membrane 15 and air gap 20 function as a high reflection mirror. When the air gap 20 is about $(\lambda/2)/\cos(\theta)$ of the basis wavelength, the membrane and air gap serve as an anti-reflection coating for the substrate 10. As an electrical signal, such as a varying voltage, is applied to the membrane 15 and substrate 10, an electrostatic force is generated between them. This force causes the membrane to move toward the substrate, as shown in FIG. 3. As the membrane 15 moves from its unbiased position, the reflectivity of the device changes. As the membrane 15 moves one-quarter of the basis wavelength, a minimum or maximum reflectivity state will be encountered, depending upon the state of the membrane 15 in the unbiased position.

If the MARS device is to operate over a range of angles of incidence up to a maximum of about 40°, then the value of θ used to determine the heights of the un-biased and biased airgaps is preferably chosen to be approximately 0.75λ/cos (an angle near the midpoint of that range, but somewhat toward the high end). For example, to operate over full 0-40 degree range, the un-biased airgap height would be preferably about 0.751λ/cos(30). In one preferred embodiment, that "midpoint" would be given by the formula:

$$\cos^{-1}\left\{\frac{1}{\left[1+\frac{1}{\cos(\max\theta)}\right]}\right\}$$

that is, the angle that averages $1/\cos(\theta)$.

The reason for dividing by cos (θ) is as follows. When θ>θ, the distance the light travels in the air gap 20 increases. The projection of this light onto the normal to the membrane 15 is decreased by cos (θ). Thus, the air gap 20 is increased by cos (θ) in order to maintain approximately the same response of the modulator 1 as for normal incidence (θ=0).

In a second preferred embodiment of layer/airgap thicknesses of the present invention, which allows for operation over a wider range of angles of maximum angle of incidence from 0° to about 55°, the thicknesses of the layers 15a-15c of the membrane 15, and the thickness of the airgap 20, deviate from the ¼–¼–½ wavelength design of the first embodiment, and are preferably chosen from Table 1 as follows:

TABLE 1

|  | Design$_{45}$ | Design$_{50}$ | Design$_{55}$ | Design$_{85}$ |
|---|---|---|---|---|
| Thick$_{Si1}$ | 175 | 165 | 160 | 205 |
| Thick$_{SiNm}$ | 335 | 345 | 330 | 110 |
| Thick$_{Si2}$ | 100 | 115 | 140 | 35 |
| Thick$_{gap0}$ | 1285 | 1360 | 1400 | 180 | where "Design$_x$" represents designs for maximum angles of incidence of 45°, 50°, 55°, and 85°, respectively. Si1 represents layer 15c; Si2 represents layer 15a; SiNm represents layer 15b (made preferably from Silicon Nitride to be explained below); and gap0 represents the air gap 20, all expressed in nanometers.

The thicknesses of the layers 15a-15c and the airgap 20 in Table 1 are optimized for a single wavelength of about 1550 nanometers. The choice of a preferred wavelength of 1550 nanometers is three-fold. First, 1550 nanometer wavelength lasers are used throughout the telephone industry and are thus inexpensive. Second, the choice of preferred wavelength should be as large as possible in order to not damage the retina when a person looks into the laser. Finally, it is generally not important that the wavelength be much larger than about 1550 nanometers as semiconductor lasers that operate at longer wavelengths are uncommon.

Figure 4:
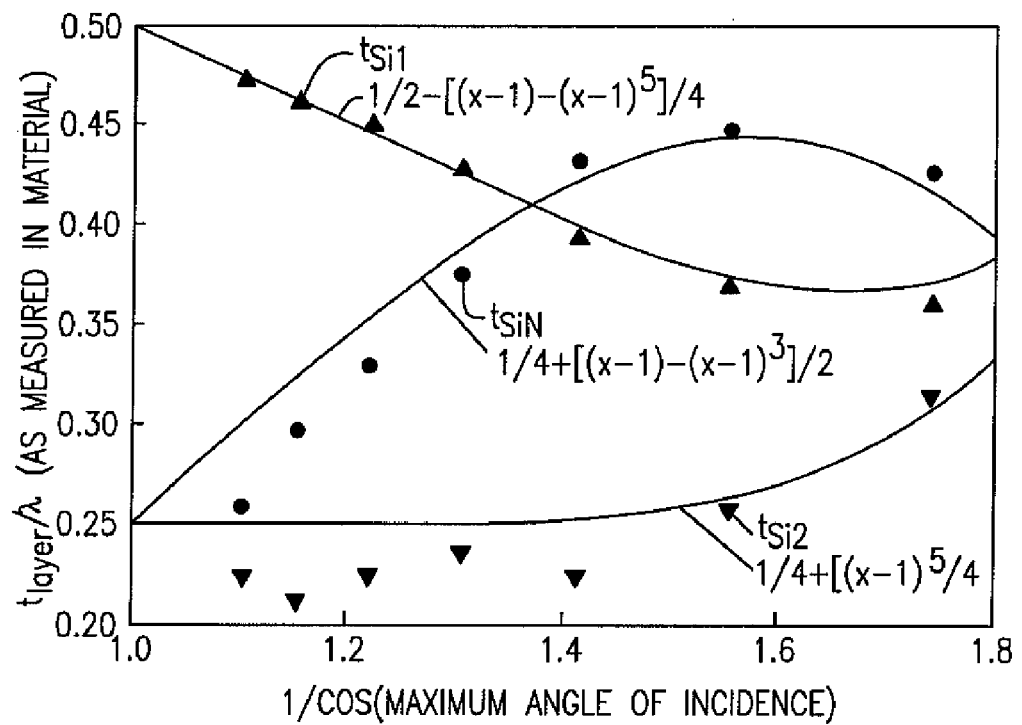
FIG. 4 is a plot of membrane layer thickness as a fraction of wavelength vs. maximum angle of incidence in accordance with the second preferred embodiment of layer/airgap thicknesses of the present invention.
Figure 5:
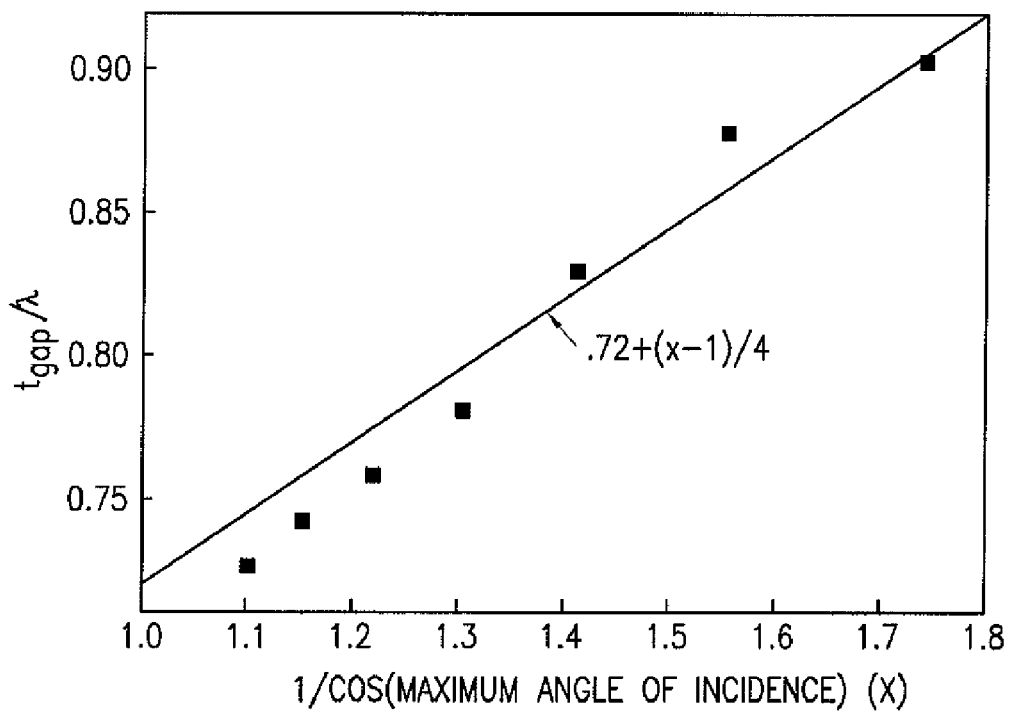
FIG. 5 is a plot of airgap thickness as a fraction of wavelength vs. maximum angle of incidence in accordance with the second preferred embodiment of layer/airgap thicknesses of the present invention.

Referring now to FIGS. 4 and 5, the preferred layer/airgap thicknesses can be fit to curves, which are applicable to a design for the range of maximum angles of incidence based on the second preferred embodiment for any given operating wavelength. When layer/gap thickness as a fraction of wavelength is plotted against 1/cos(maximum angle of incidence), x, the preferred thicknesses of the layers 15a-15c and the airgap 20 approximately follow the following formulas:

$$^{Thick}Si1 \cong \frac{1}{2} - [(x-1)-(x-1)^5]/4;  \quad \text{i.}$$

$$ThickSiN \cong \frac{1}{4} - [(x-1)-(x-1)^3]/2;  \quad \text{ii.}$$

$$ThickSi2 \cong \frac{1}{4} + (x-1)^5/4;  \quad \text{iii. and}$$

$$^{Thick}gap0 \cong 0.72 + (x-1)/4  \quad \text{iv.}$$

For normal angles of incidence, the polarization of the incident light is not relevant. For non-normal incident angles, the differential reflectivity depends on both the angle of incidence and the polarization of both the electric (TE polarization) and the magnetic (TM polarization) fields. The first and second embodiments of the layer/airgap thicknesses provide optimal differential reflectivity for angles of incidence less than or equal to about 55° for both TE and TM polarization. In a third preferred embodiment of the layer/airgap thicknesses, adequate differential reflectivity can be maintained over nearly the entire range of angles of incidence up to 90° for TE polarization. The column of Table 1 designated Design$_{85}$ shows the optimal design thicknesses for a maximum angle of incidence of 85°, wavelength of 1550 nanometers, and TE polarization. When the thicknesses for Design$_{85}$ are normalized (i.e., divided by 1550 nanometers), the optimal thicknesses as a fraction of wavelength for any desired wavelength and maximum angle of incidence of about 85° can be obtained.

The aforementioned behavior is a function of the relationship of the refractive index of the membrane layer 15b to the refractive index of the substrate 10, as well as the thickness of the layer 15b. If the refractive index of the membrane is about equal to the square root of the refractive index of the substrate, an anti-reflection condition can be created. This relationship is well known to those skilled in the art. See Condon and Odishaw, ed., "Handbook of Physics," at 6-102-6-103, (2nd ed., McGraw-Hill, 1967). Modulation of an optical signal is thus achieved by altering the reflectivity of the device.

Figure 6:
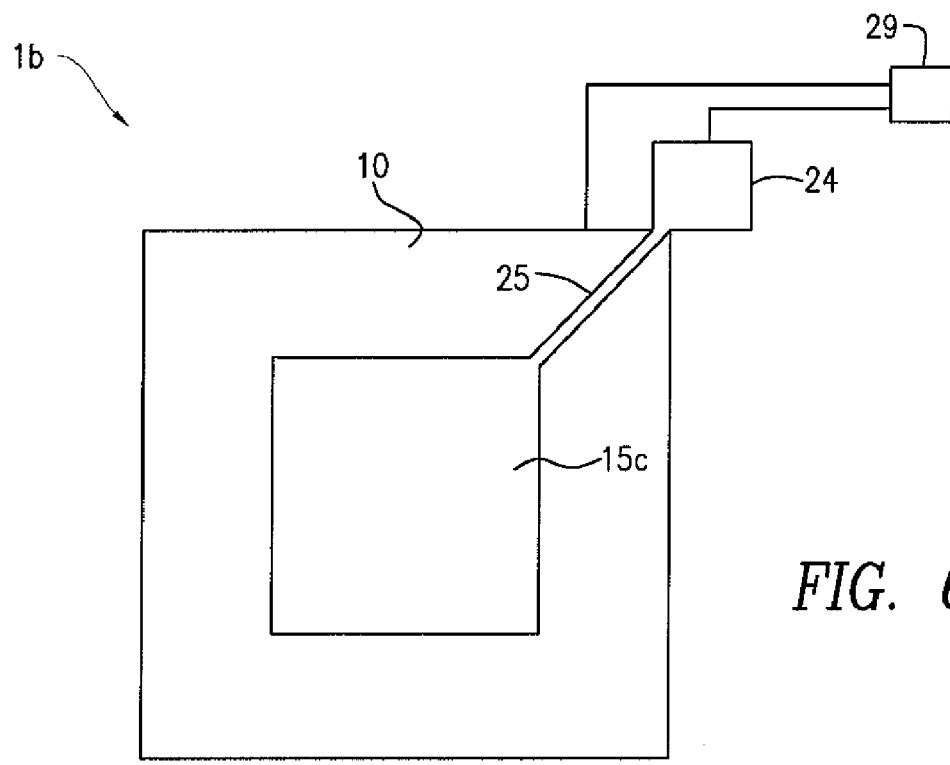
FIG. 6 is a plan view of a third embodiment of a MARS modulator according to the present invention wherein the membrane is supported by a cantilever beam.

Referring back to the structure of the present invention, the flexible support arms 25 that suspend the membrane 15 above the substrate 10 may be arranged in any convenient manner and may number more or less than the four arms pictured in FIGS. 2 and 2a. The flexible support arms 25 serve as a support means for the membrane 15 and also allow the membrane to move relative to the substrate. While a single structure, i.e., the support arms, provides this dual function, these functions could be provided by independent structures. For example, a rigid support used in conjunction with a separate flexing member can provide support and mobility for the membrane 15. Other configurations and arrangements capable of supporting the membrane 15, and allowing it to move, are within the contemplated scope of the present invention; it being recognized that such variations will occur to those skilled in the art in view of the present teachings. In addition, the support arms 25 may be part of the membrane 15, or, alternatively, may be a separate structure formed of a different material. Further, as shown in FIG. 6, a single support arm, i.e., a cantilever support, may be used.

As previously noted, the electrode 30 may comprise a layer of conductive material deposited on the membrane. Any suitably conductive material may be used to form the electrodes, including, without limitation, aluminum, platinum, tungsten, conducting silicon, ITO or, preferably, gold. As shown in FIG. 2a, the electrodes 30 form a continuous conductive layer covering at least a portion of the support arms 25 and the perimeter of the layer 15c forming a border region 17. The inner edge 19 of the border region 17 defines an optical window 16 in the membrane 15 for modulators, such as the modulator 1a, having a discrete electrode 30. Such an optical window is required when the conductive material applied as electrode 30 is not optically transparent at the operating wavelength of the modulator. A distinct optical window 16 is not required in the layer of conductive material when the conductive material is, for example, ITO, since ITO is optically transparent. The electrode 30 may further include a region 24 extending beyond each support arm 25. As shown in FIGS. 1 and 3, a contact 31 may be formed on the substrate 10 to facilitate electrical connection with the controlled voltage source 29. Such a contact point may be provided on the electrode 30 or conductive membrane layer, as well. As previously described, the separate electrode 30 is not required if any of the membrane layers are suitably conductive.

While the optical window 16 is shown to have a circular shape in FIG. 2a, the window 16 may have any shape. The size of the optical window will vary with the particular application for which the invention is used. The optical window 16 should preferably be sized so that the optical "spot" produced by the optical window will be captured by the numerical aperture of the waveguide or other optical device being used in conjunction with the invention for normal angles of incidence. For non-normal angles of incidence in free space communications applications, the optical window will generally be larger than for designs that employ only normal angles of incidence. It will be appreciated that using conductive membrane layers, rather than a discrete electrode 30, results in a lower moving mass and hence a better response time for the modulator.

Figure 7:
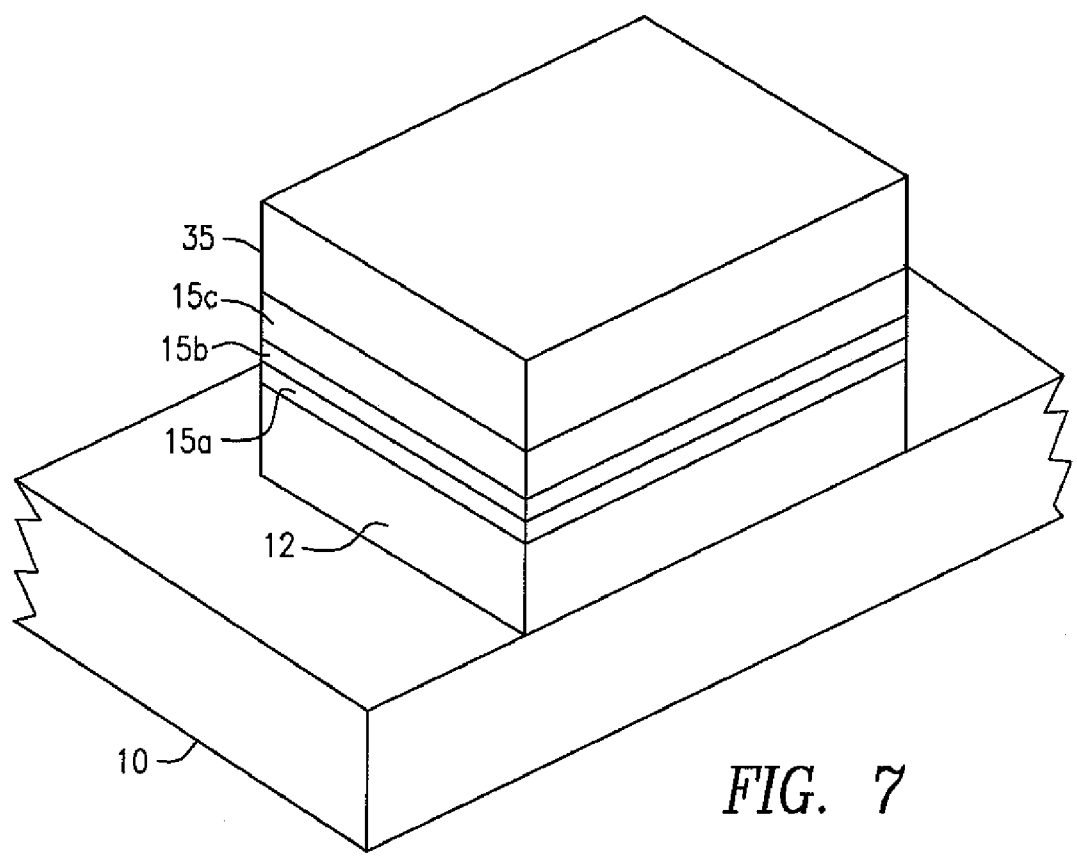
FIG. 7 is a perspective view of various layers of material deposited on a substrate, which layers will be patterned into a MARS modulator according to the present invention.

The MARS modulator 1 of FIGS. 1 and 2 may be formed as follows. The substrate 10, which may be in the form of a wafer, is preferably silicon which is doped with phosphorus or boron. As shown in FIG. 7, several layers of material, as described below, are deposited on the substrate 10. First, a sacrificial layer 12 of an erodible material is deposited on the substrate. The erodible material is chosen so that a suitable wet etch will erode this material at a much greater rate than any other of the materials which comprise the device. Suitable erodible materials include, but are not limited to, silicon dioxide and aluminum. Preferably, the erodible material is phospho-silicate glass ("PSG"), e.g., silicon dioxide doped with phosphorus. The erodible material is deposited to a thickness approximately equivalent to that desired for the unbiased air gap 20.

A layer of polysilicon or other suitable material is deposited to form layer 15a, as shown in FIG. 7. Next, a suitable material, preferably silicon nitride, is deposited to form the layer 15b. Layers 15a and 15b should be deposited to a thickness equal to that which is indicated above for the first through third preferred embodiments of layer/airgap thicknesses. Finally, another layer of polysilicon or other suitable material is deposited to form layer 15c, which layer should be deposited to a thickness also as indicated above for the first through third preferred embodiments of layer/airgap thicknesses. The layer 15b is deposited under conditions so as to achieve a refractive index approximately equal to the square root of the refractive index of the substrate 10. Techniques for tailoring the refractive index of a material are well known to those skilled in the art. See Smith et al., "Mechanism of $SiN_xH_y$ Deposition from $N_2$—$SiH_4$ Plasma," Jnl. Vac. Sci. Tech. B(8), #3 at 551-57 (1990). The layers 15a and 15c should have refractive indices which are approximately equal to the refractive index of the substrate 10.

Figure 8:
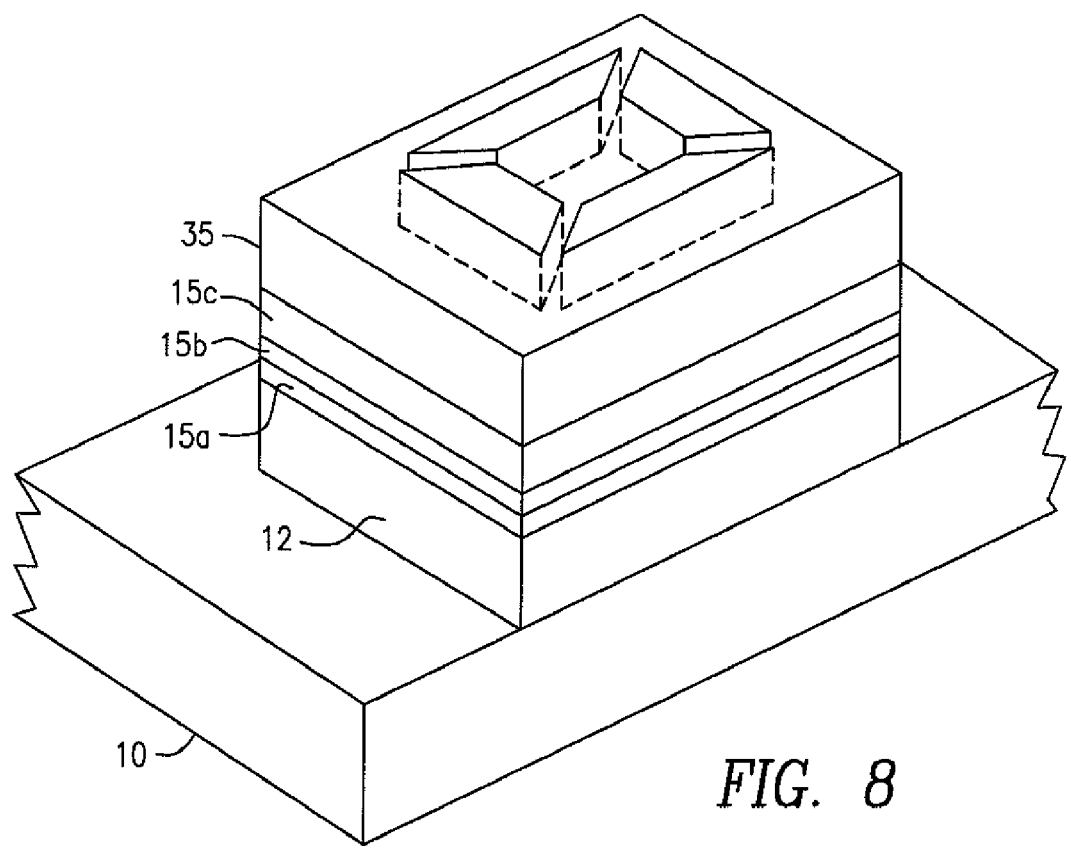
FIG. 8 shows the layers of FIG. 7 with holes patterned in the photoresist layer.

Photolithographic steps follow the deposition of these layers. The photolithographic process is well known to those skilled in the art and the details of this process will not be discussed in detail here. See Ruska, Microelectronic Processing, Chap. 4, "Photolithography," at 114-17 (1987). In the first photolithographic step, which may be referred to as the etch step, a photoresist 35 is applied to the uppermost membrane layer, which is the layer 15c in the embodiment shown in FIG. 7. Four openings are then created in the photoresist layer, as shown in FIG. 8, using an appropriately patterned mask. The openings are shown as trapezoidal in shape. The shapes of the openings are a function of the desired support arm arrangement. In the MARS modulator 1 shown in FIG. 2, the support arms 25 originate at the corners of a first square and terminate at the corners of a second smaller square (the membrane 15) located within the perimeter of the first square. Thus, trapezoidal shaped openings define the structure. As previously discussed, the support arms 25 may be arranged in any convenient manner, and may number more or less than four, and may also have any suitable physical configuration. For other support arm arrangements, the openings created in the photoresist layer may therefore differ in number and shape from those shown in the present example. Small openings, not shown, may be provided near the center of the membrane 15 to facilitate removal of a portion of the sacrificial layer 12 to create the air gap 20.

Figure 9:
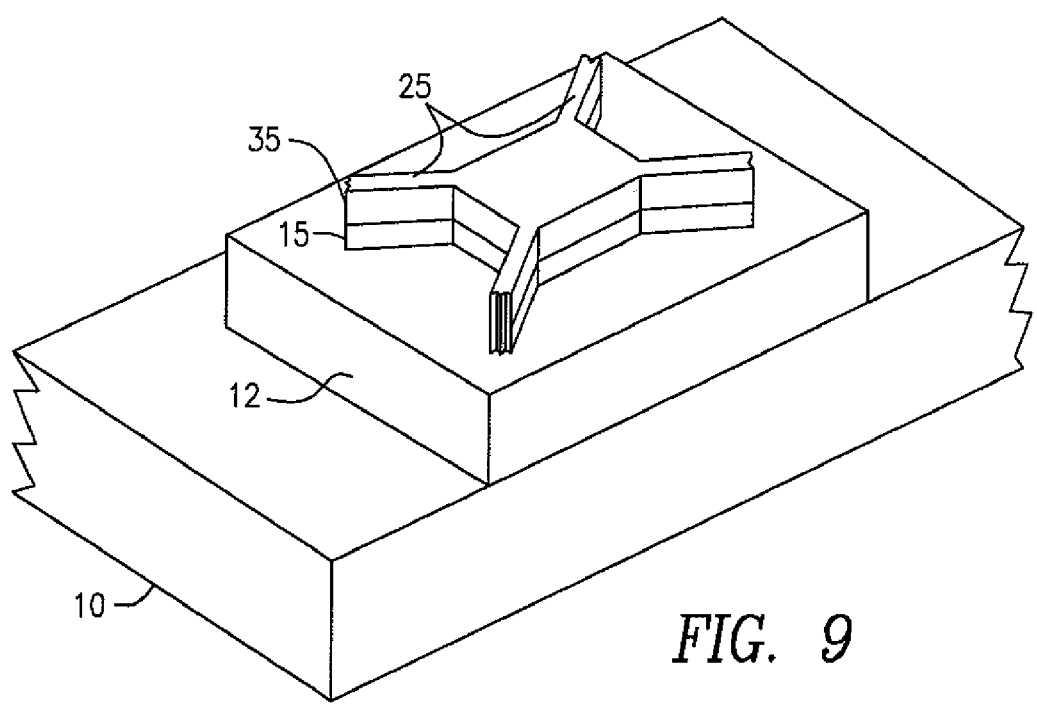
FIG. 9 is a cutaway view of the layers of FIG. 7 after patterning and etching to define the membrane and support arms.

The layers located beneath the trapezoidal openings are removed using reactive ion etching or other suitable methods. By forming four trapezoidal shaped openings in the layers 15a-15c, the support arms 25 and the membrane 15 are defined, as shown in FIG. 9. FIG. 9 is a cutaway view, wherein the material used for the layers 15a-15c and the photoresist surrounding the structure are not shown. It should be understood that the membrane 15 and support arms 25 are surrounded by material comprising layers 15a-15c and 35, other than the trapezoidal shaped regions which have been removed as described.

Figure 10:
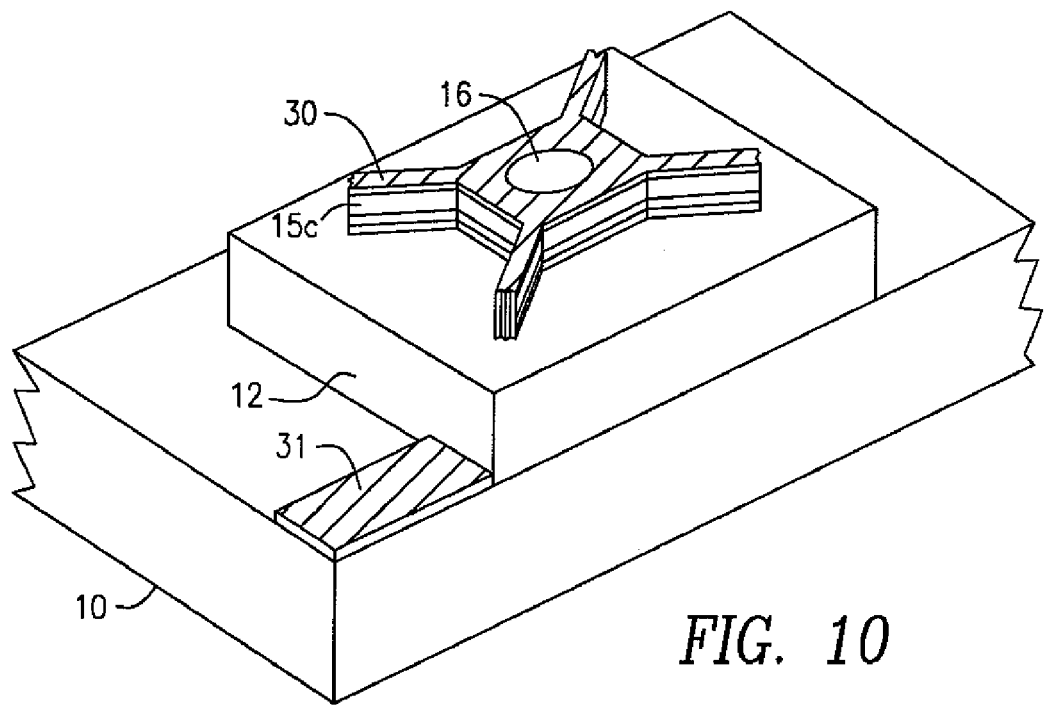
FIG. 10 shows contacts added to the arrangement shown in FIG. 9.

Hardened photoresist remaining on the structure is then removed. If a discrete electrode 30 is to be deposited on the membrane, a second photolithographic step is required. In such a case, photoresist is applied and patterned using a second photomask. The areas of the device which are not to be coated with conductive material are protected by the hardened photoresist. In the embodiment shown in FIG. 10, conductive material is deposited at discrete regions on the layer 15c. Specifically, conductive material may be deposited at a region 24 extending beyond each of the support arms, on the support arms 25 and along the edge of the layer 15c to form the border region 17, as shown in FIG. 3. The conductive material so deposited forms a continuous surface for electrical conduction, defining electrode 30. A contact 31 may also be formed on the substrate 10 by depositing conductive material thereon.

Figure 11:
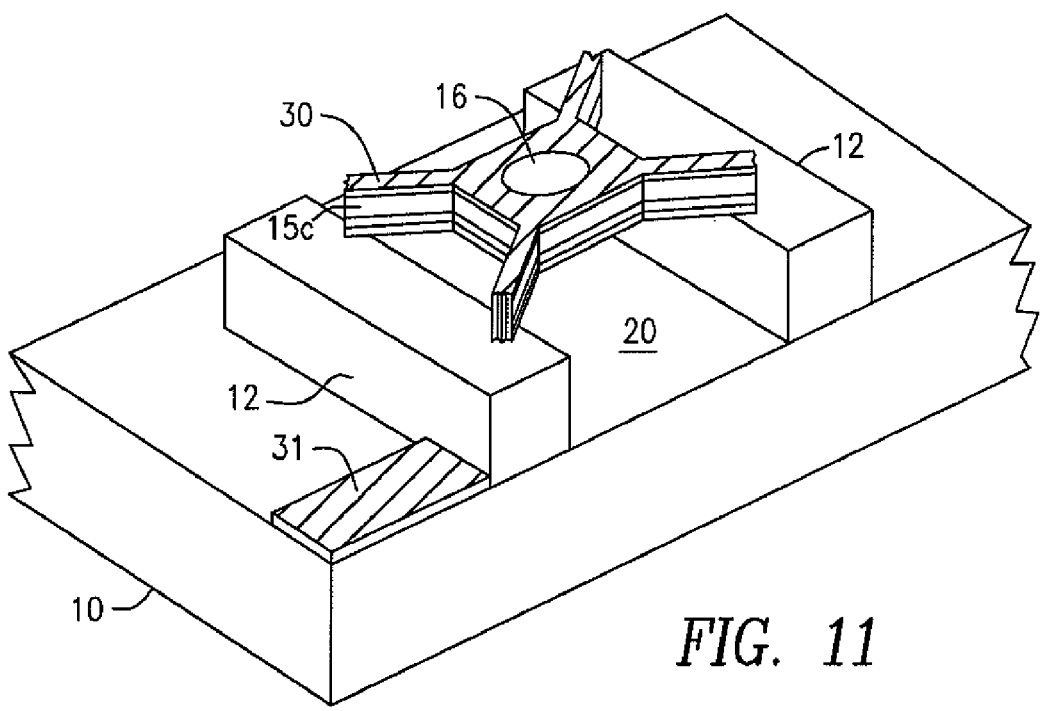
FIG. 11 shows the erodible layer etched away to form an air gap between the membrane and the substrate.

The structure is then placed in a suitable etch bath for etching the sacrificial layer 12 without attacking the silicon nitride. Suitable etches include, but are not limited to, commercial aluminum etchant if the sacrificial layer is aluminum, and HF acid-based solutions for PSG or aluminum sacrificial layers. Forming the layers 15a and 15c from polysilicon allows the use of fast HF acid etches without a protective layer of photoresist. As shown in FIG. 11, the air gap 20 is formed as the portion of the sacrificial layer 12 beneath the membrane 15 and support arms 25 is removed. The etch is timed to limit the amount of undercut of the membrane.

Figure 12:
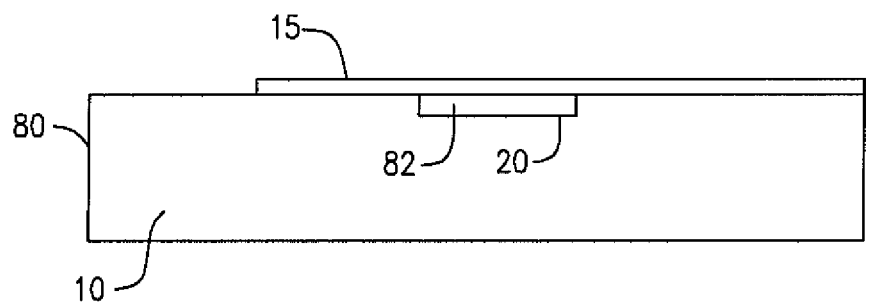
FIG. 12 shows a preferred embodiment of a MARS modulator according to the present invention.
Figure 13:
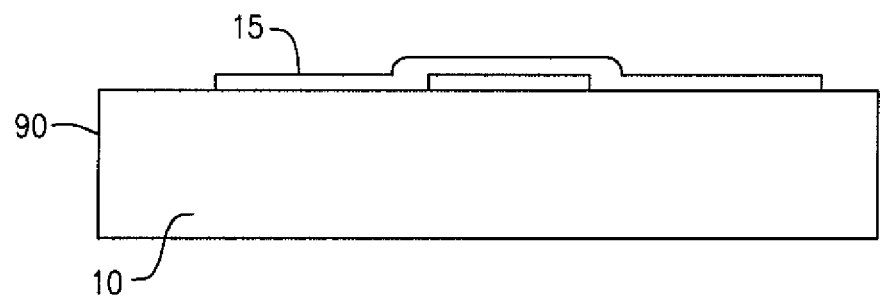
FIG. 13 shows a second preferred embodiment of a MARS modulator according to the present invention.

FIGS. 12 and 13 show two preferred embodiments of a MARS modulator according to the present invention. FIG. 12 shows a MARS modulator 80 wherein a well 82 is formed in the substrate 10. The membrane 15 is formed adjacent to the substrate 10. As in the previous embodiment, the membrane may be comprised of three or more layers, not shown. An air gap 20 is defined in the region where the membrane 15 overlays the well 82. A second silicon nitride layer 18 may be formed on top of the substrate 10 below the air gap 20. As in the previous embodiment, if none of the membrane layers are suitably conductive, a discrete electrode 30, not shown, is provided on the membrane 15 so that a voltage can be applied to the device 80 generating an electrostatic force between the membrane and the substrate. The membrane 15 and support arms 25 (not shown) of the device 80 may have a configuration like the previous embodiment, or may be configured in other suitable arrangements which may occur to those skilled in the art in view of the teachings provided herein.

To form the MARS modulator 80, the well 82 is formed in a suitably prepared substrate 10, using milling or etching techniques known to those skilled in the art. If required, the second silicon nitride layer 18 is deposited on the substrate 10. The depth of the well should be equal to the desired thickness of the air gap 20 in the unbiased position. The well 82 is then filled with an erodible material, preferably PSG. Next, the membrane layers 15a-15c are deposited as described for the previous embodiment. Photoresist is applied and patterned to form the membrane 15 and support arms 25 as previously discussed. The erodible material is etched away, resulting in the air gap 20. The well 82 defines the boundaries of the air gap, i.e., the extent of the etch, so that attention to the timing of the etch is not as critical as for the previous embodiment.

In a preferred embodiment for forming the MARS modulator 80, a silicon nitride layer is formed on a silicon wafer. An opening is formed in the silicon nitride layer down to the silicon wafer, at the intended site for the well 82. The opening may be formed using reactive ion etching or other methods known to those skilled in the art. The wafer, with the etched silicon nitride layer, is then placed in a thermal oxidation furnace. Silicon which is exposed to the atmosphere in the furnace, i.e., the silicon exposed as a result of the opening which is formed as described above, is oxidized. The oxide grows into the silicon wafer. This is the functional equivalent of filling the well 82 with silicon dioxide. Thermal oxidation is well characterized and understood by those skilled in the art. Through the appropriate combination of exposure time, furnace temperature and environment, the oxide penetration of the silicon wafer can be controlled to the desired depth, i.e., that depth which results in a suitable air gap 20 upon removal of the silicon oxide. The silicon oxide can be ion-implanted with phosphorus or boron and phosphorous to enhance its solubility in HF-based solutions to facilitate removal, if desired. After removing the silicon nitride layer, material appropriate for forming the layers 15a-15c, such as polysilicon and silicon nitride, is applied to the wafer. The layers are then patterned and etched, an electrode is deposited if none of the membrane layers are conductive, and the silicon oxide is removed to form the well 82 which results in an air gap 20 between the layer 15a and the substrate 10 (or the second silicon nitride layer 18, if necessary), i.e., the silicon wafer.

Figure 14:
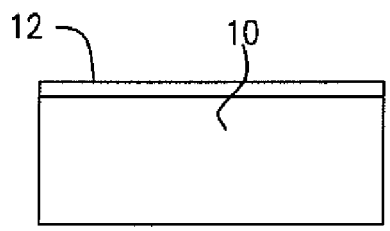
Figure 15:
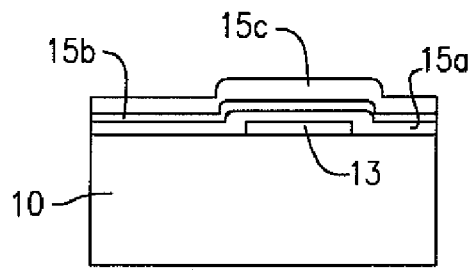
Figure 16A:
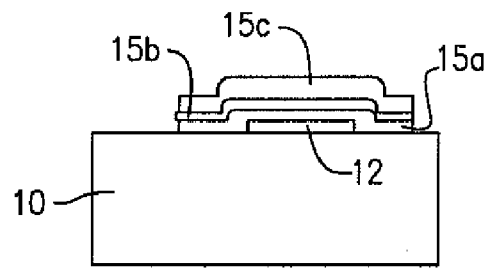
Figure 16B:
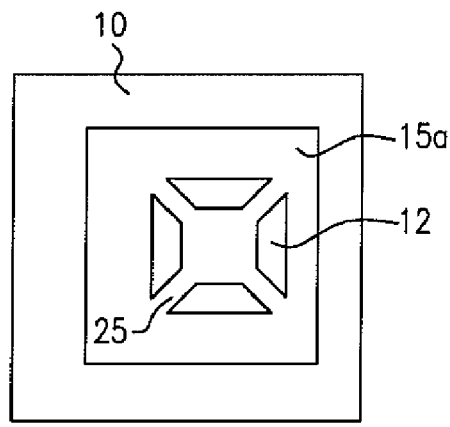
Figure 17A:
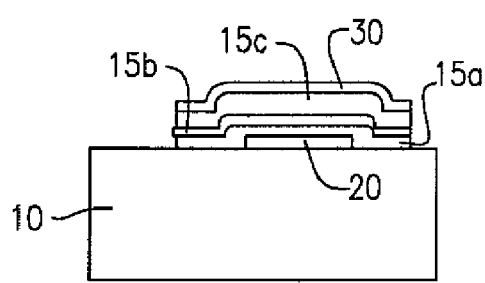
Figure 17B:
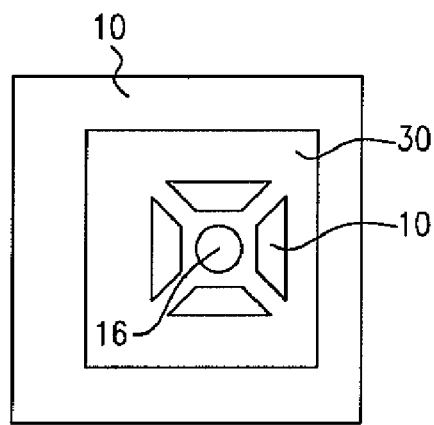

FIG. 13 shows a second preferred embodiment of a MARS modulator 90 according to the present invention. Rather than forming a well in the substrate to create the air gap 20, as in the previous embodiment, an "island" 13 of erodible material is formed on the substrate 10 (or the second silicon nitride layer 18, if necessary), which will be etched away to form the air gap 20. An exemplary embodiment of a method of making the MARS modulator 90 is illustrated in FIGS. 14-17b. As shown in FIG. 14, an appropriately prepared substrate 10 (or the second silicon nitride layer 18, if necessary), is coated with a sacrificial layer 12 of erodible material. The sacrificial layer 12 is patterned into an "island" 13 having the dimensions desired for the air gap 20, shown in FIG. 15. The layers 15a-15c are next deposited on the island 13 of erodible material. These layers extend beyond the island 13 onto the substrate 10. Photoresist is applied and the layers 15a-15c are patterned into the membrane shape, as shown in cross section in FIG. 16a and in a plan view in FIG. 16b. Next, the electrode 30 is deposited and patterned, if appropriate. Finally, the erodible material is removed from beneath the layers 15a-15c, forming an air gap 20 between the layers and the substrate 10 (or the second silicon nitride layer 18, if necessary). The etch to remove the erodible material proceeds until the material forming the layer 15a is encountered. As in the previous embodiment, this simplifies forming an air gap relative to a timed etch. FIGS. 17a and 17b show the fully formed MARS modulator 90, including an electrode 30.

The devices 1, 1a, 1b, 80 and 90 function as previously described. Modulators according to the present invention, such as the modulators 1, 1a, 1b, 80 and 90, have been described as having a membrane comprising three layers 15a-15c. Other modulators having a membrane with more than three layers of appropriate refractive index and thickness may realize the benefits of the present invention, as well. Such designs are within the contemplated scope of the present invention.

Figure 18:
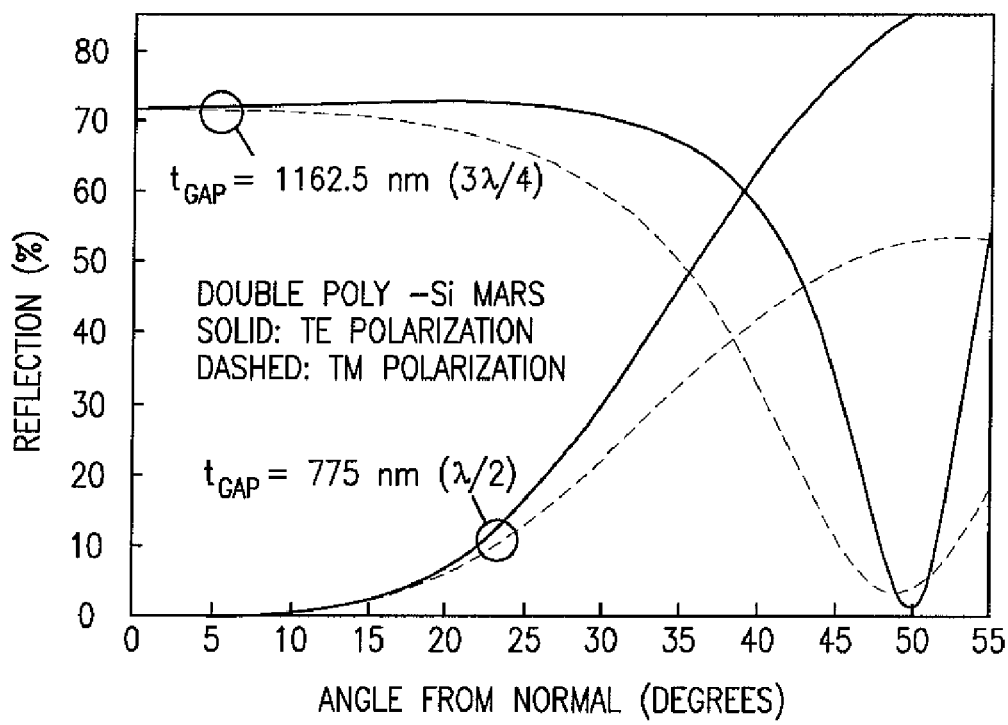
FIG. 18 is a plot of reflectivity vs. angle-of-incidence of the optical signal for a MARS modulator optimized for normal angle of incidence according to the present invention.

Modulator performance may be evaluated from FIGS. 18-24, which plot percent reflection vs. angle from normal. FIG. 18 shows the performance for the three-layer membrane device of the Goossen '819 patent at a wavelength of 1550 nanometers. Note that the device of the Goossen '819 patent was optimized for operation over a wide range of wavelengths as is used in optical communication. For free air-space applications, the design is optimized for a single wavelength. The air gap 20 in the unbiased state is about 1162.5 nanometers≅3λ/4 for maximum reflectivity of about 70% for incident angles between 0° and about 30° for TE polarization. The performance for TM polarization is somewhat less. The air gap 20 in the biased state is about 775 nanometers≅λ/2 for minimum reflectivity for incident angles between 0° and about 30° for TE polarization. Note that differential reflectivity is maintained for incident angles up to about 33° (about 5° below the intersection point of the minimum and maximum air gap curves).

Figure 19:
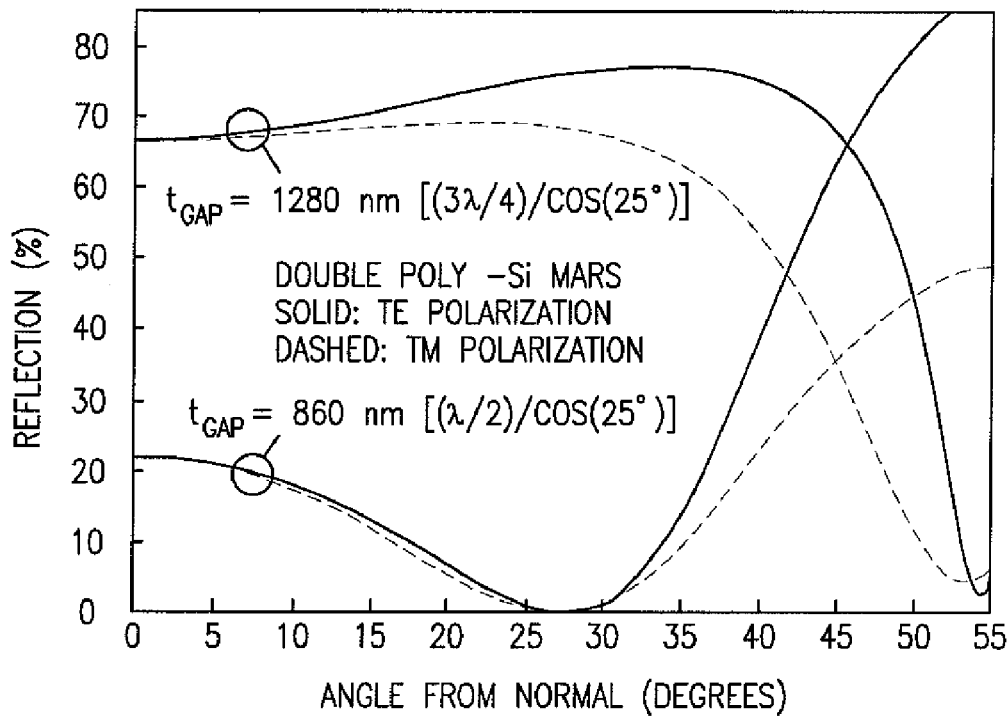
FIG. 19 is a plot of reflectivity vs. angle-of-incidence of the optical signal for a MARS modulator designed for a "midpoint" angle of incidence of about 25° according to the present invention.
Figure 20:
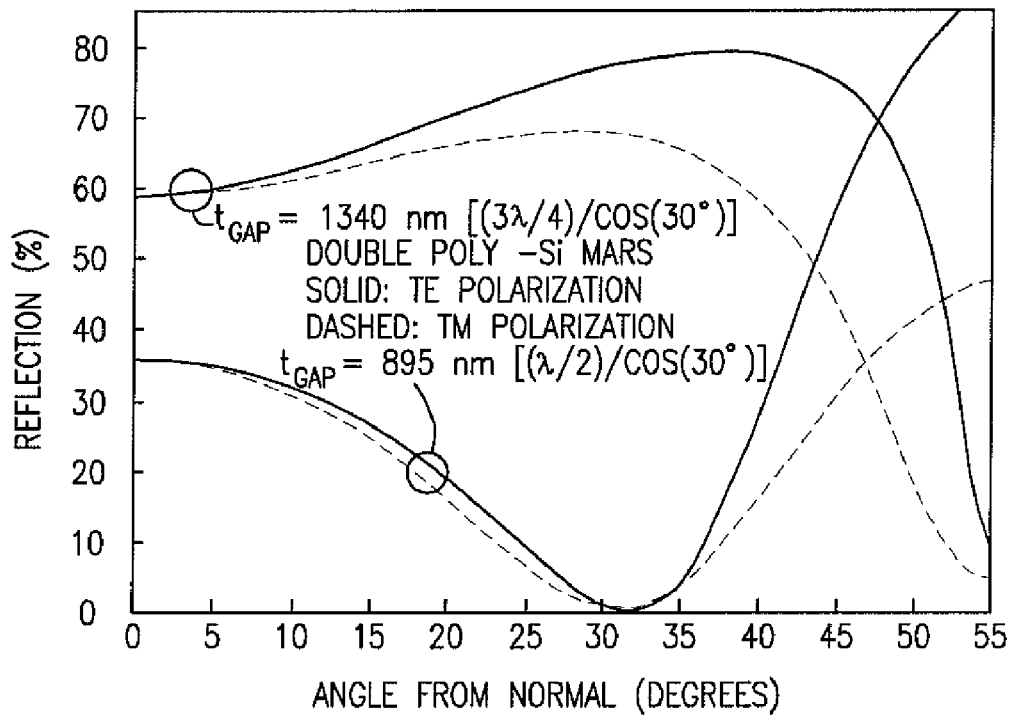
FIG. 20 is a plot of reflectivity vs. angle-of-incidence of the optical signal for a MARS modulator designed for a "midpoint" angle of incidence of about 35° according to the present invention.
Figure 21:
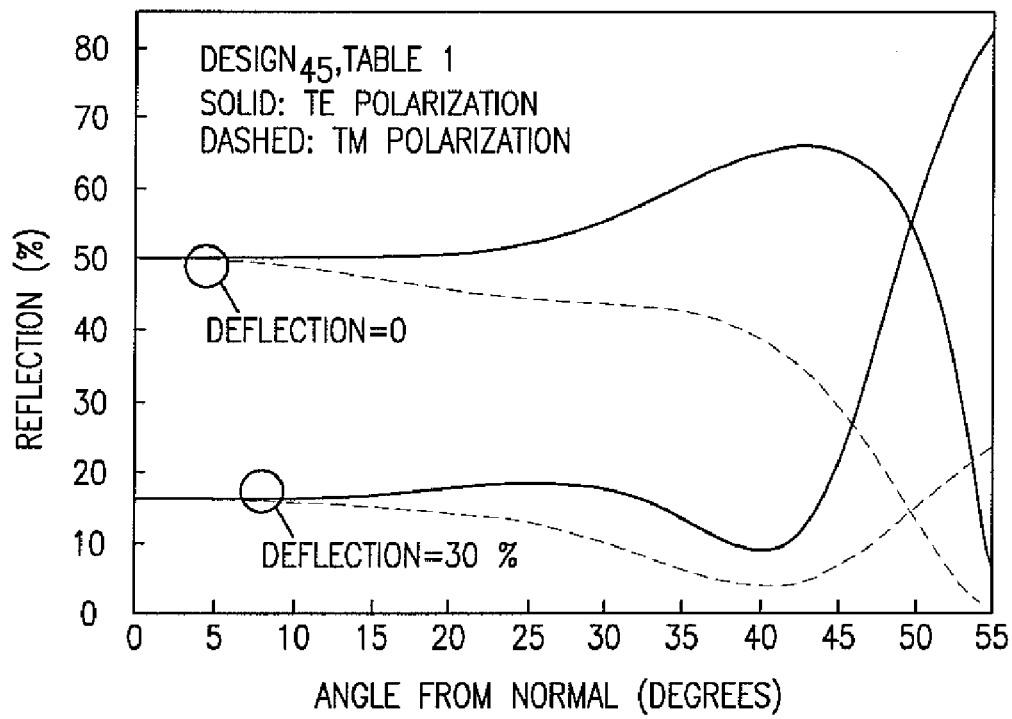
FIG. 21 is a plot of reflectivity vs. angle-of-incidence of the optical signal for a MARS modulator designed for a maximum angle of incidence of about 45° and operating wavelength of 1550 nanometers according to the present invention.
Figure 22:
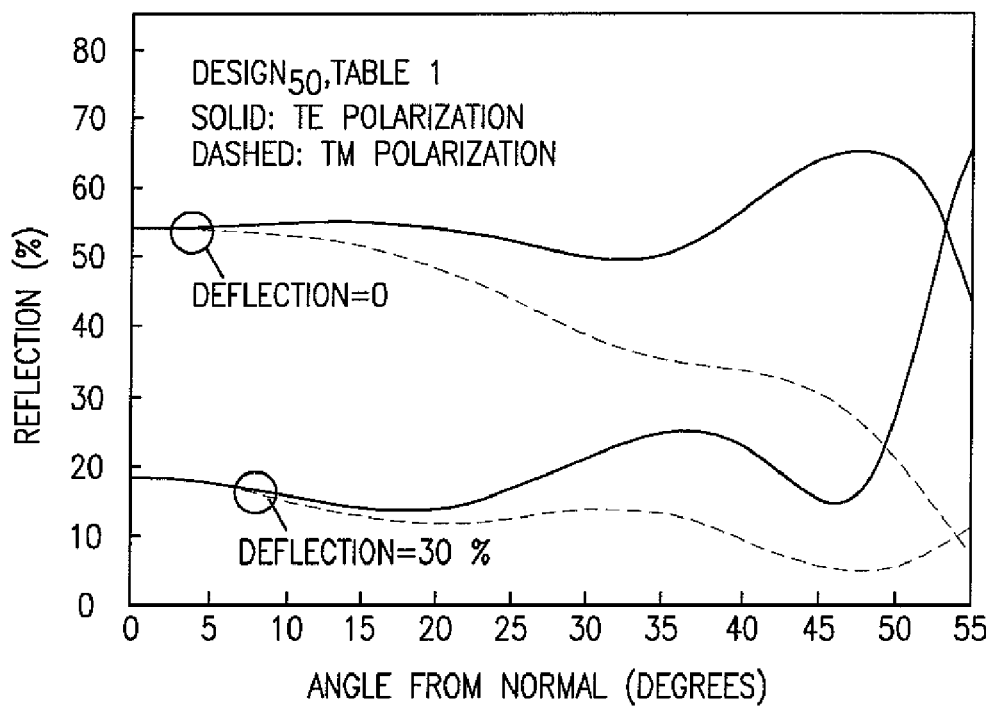
FIG. 22 is a plot of reflectivity vs. angle-of-incidence of the optical signal for a MARS modulator designed for a maximum angle of incidence of about 50° and operating wavelength of 1550 nanometers according to the present invention.
Figure 23:
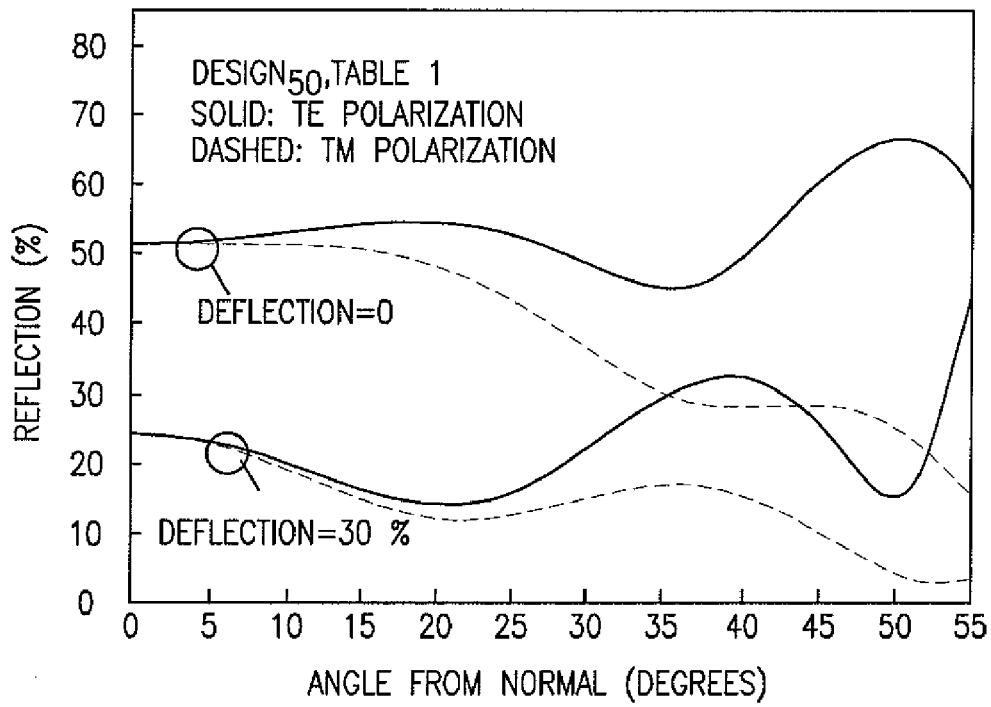
FIG. 23 is a plot of reflectivity vs. angle-of-incidence of the optical signal for a MARS modulator designed for a maximum angle of incidence of about 55° and operating wavelength of 1550 nanometers according to the present invention.
Figure 24:
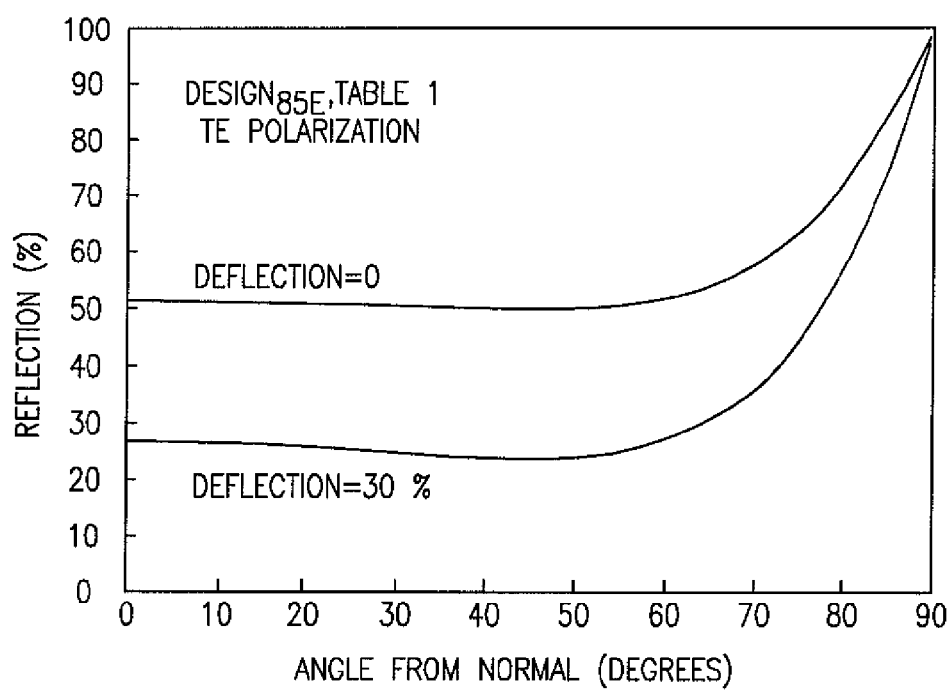
FIG. 24 is a plot of reflectivity vs. angle-of-incidence of the optical signal for a MARS modulator designed for a maximum angle of incidence of about 85°, operating wavelength of 1550 nanometers, and having TE polarization according to the present invention.

Maximum reflectivity can be optimized for non-normal angles of incidence for the three layer membrane design using the 3λ/4*1/cos(θ) and λ/2*1/cos(θ) formulas as shown in FIGS. 19 and 20 for "mid-point" angles of 25° and 35°, respectively. Note that the best differential reflectivity occurs about 3° less than the designed-for angle of maximum differential reflectivity, and that differential reflectivity drops off for normal angles of incidence compared to the performance of the modulator as depicted in FIG. 18. The performance of the designs for a wavelength of 1550 nanometers and for maximum angles of incidence of about 45°, 50°, and 55° are plotted in FIGS. 21-23, respectively. FIG. 24 shows the performance optimized for a maximum incident angle of about 85° and TE polarization. Not that, in FIG. 24, differential reflectivity is non-zero for the full range of incident angles up to about 90°. Percent deflections of 0% and 30% depicted in FIGS. 21-24 indicate the percent movement of the membrane from un-biased to biased positions as a fraction of the total thickness of the airgap.

Figure 25:
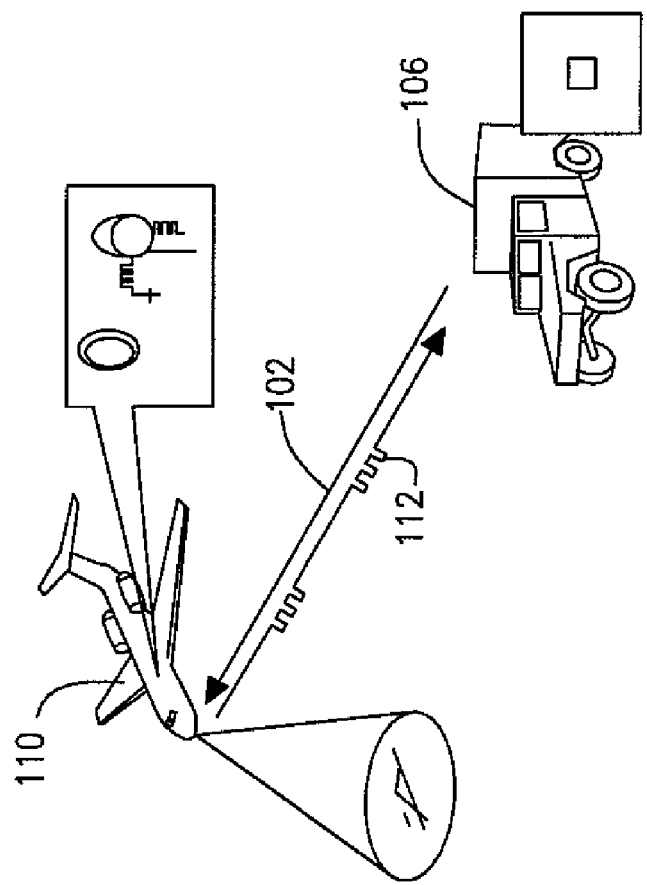
FIG. 25 is a schematic view of a non-normal angle of incidence application for the MARS modulator of the present invention, in which a military vehicle aims a light beam at a moving unmanned aircraft, the light beam being reflected back toward the military vehicle and modulated to carry an optical data signal.
Figure 26:
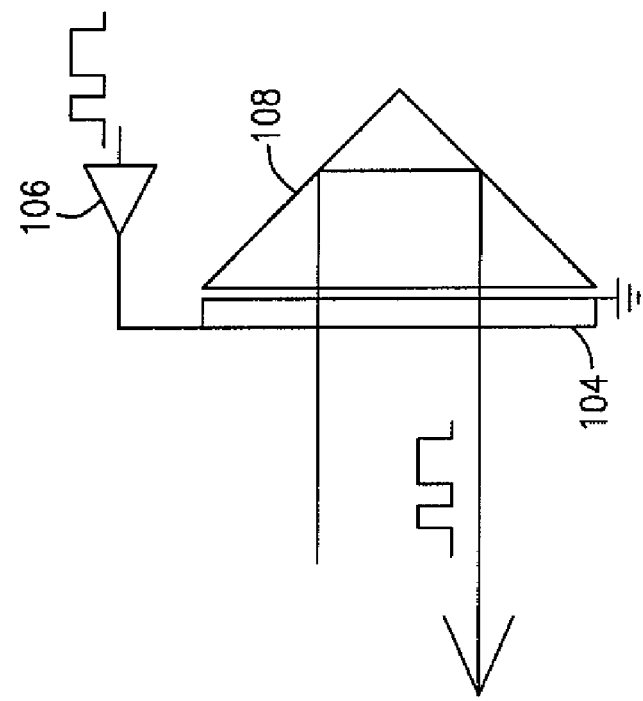
FIG. 26 is a schematic view of a MARS modulator according to the present invention used in conjunction with a corner cube reflector for transmitting the optical data signal as depicted in FIG. 25.

FIGS. 25 and 26 show a typical non-normal angle of incidence (free space communications) application. A military vehicle 100 aims a coherent beam of laser radiation 102 toward a modulator 104, electronics 106, and a corner cube reflector 108 located on an unmanned aircraft 110. The electronics 106 applies a bias to the modulator 104 to cause its membrane (not shown) to move in sympathy with a data signal 112 that is to be transmitted optically back toward the military vehicle 100. Since the military vehicle 100 is moving at a different speed relative to the unmanned aircraft 110, it is desirable that the modulator work over a wide range of incident angles in order for the data signal 112 to be received by the moving military vehicle 100.

Figure 27:
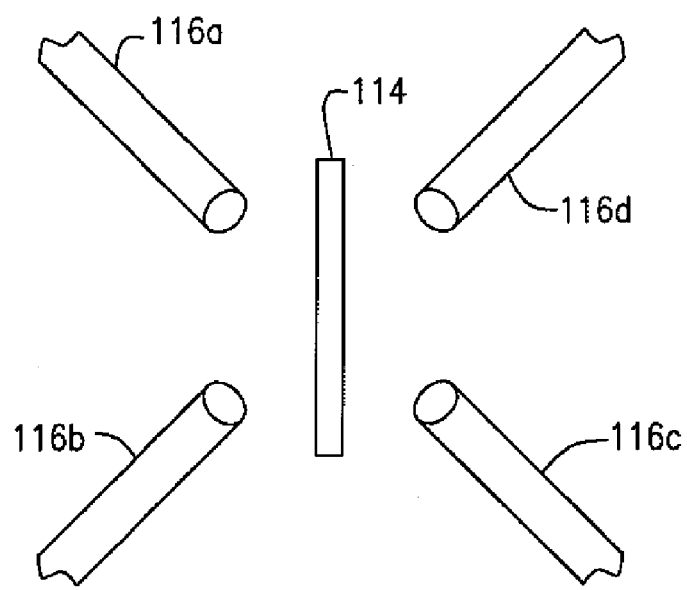
FIG. 27 is a schematic view of a MARS modulator used in combination with optical fibers to function as a 2×2 optical switch.

Now referring to FIG. 27, another non-normal angle of incidence application is depicted. The modulator 114 can be placed between four optical fibers 116a-116d all of which aim light at an angle of incidence of about 45° relative to the plane of the modulator 114. When the modulator 114 is unbiased, a light beam (not shown) emanating from the optical fiber 116a will be reflected toward the optical fiber 116b, while a light beam emanating from the optical fiber 116c will be reflected toward the optical fiber 116d. When the modulator 114 is biased, a light beam emanating from the optical fiber 116a will be transmitted through the optical fiber 116c, while a light beam emanating from the fiber 116b will be transmitted through the optical fiber 116d. Thus, the modulator 114 in combination with the optical fibers 116a-116b, can function as a 2×2 optical switch.

It will be understood that the embodiments described herein are merely exemplary and that a person skilled in the art may make many variations and modifications without departing from the spirit and scope of the invention. All such variations and modifications are intended to be included within the scope of the present invention as defined in the appended claims.

What is claimed is:

1. Modulator for modulating an optical signal comprising:
   a substrate;
   a support mounted to said substrate;
   a membrane attached to said support and defining an airgap between said substrate and said membrane, said membrane having a central layer of a first thickness and said airgap having a second thickness, wherein said first and second thicknesses are optimized to allow reflection of light incident on said membrane at a non-normal angle of incidence to said membrane when said membrane is unbiased; wherein said airgap has a thickness of approximately $(3\lambda/4)/\cos(\theta)$ when said modulator is unbiased, wherein $\lambda$ is the basis wavelength of light incident on said membrane, and wherein $\theta$ is an angle of incidence of said light relative to the normal to the plane of the substrate; and means for applying a bias voltage between said membrane and said substrate, wherein said bias voltage deforms said membrane from a first position to a second position, and reduces said second thickness so as to allow said light to pass through said membrane.

2. The modulator of claim 1, wherein said central layer has a refractive index which is approximately equal to the square root of the refractive index of the substrate.

3. The modulator of claim 2; wherein said membrane further comprises a pair of outer layers in contact with said central layer, wherein each of said pair of outer layers has a refractive index which is approximately equal to refractive index of the substrate.

4. The modulator of claim 3, wherein one of said pair of outer layers has a thickness approximately equal to one-quarter of a wavelength of the optical signal; wherein the other of said pair of outer layers has a thickness approximately equal to one-half of a wavelength of the optical signal; and wherein the central layer has a thickness approximately equal to one-quarter of a wavelength of the optical signal.

5. The modulator of claim 1, wherein said airgap has a thickness of approximately $(\lambda/2)/\cos(\theta)$ when said modulator is biased.

6. The modulator of claim 5 wherein said gap is designed to operate over a range from an angle of incidence between zero degrees and a maximum angle of incidence, wherein the value of $\theta$ is chosen to be approximately a mid-point between zero degrees and said maximum angle of incidence.

7. The modulator of claim 6, wherein the value of $\theta$ is greater than said mid-point.

8. The modulator of claim 6, wherein said value of $\theta$ is chosen according to the formula $$\cos^{-1}\left\{\frac{1}{\left[1+\frac{1}{\cos(\max\theta)}\right]}\right\}.$$

9. The modulator of claim 3, wherein one of the outer layers has a thickness approximately given as a fraction of the wavelength of the incident light by the formula $1/4+(x-1)5/4$ where x is $1/\cos$(maximum angle of incidence); wherein the central layer has a thickness approximately given as a fraction of the wavelength of the incident light by the formula $1/4-[(x-1)-(x-1)3]/2$; wherein the other of the outer layers has a thickness approximately given as a fraction of the wavelength of the incident light by the formula $1/2-[(x-1)-(x-1)^5]/4$; and wherein the airgap has a thickness approximately given as a fraction of the wavelength of the incident light by the formula $0.72+(x-1)/4$.

10. The modulator of claim 3, wherein thicknesses of the pair of outer layers, said central layer, and said airgap are optimized for a maximum angle of incidence of about 85 degrees and TE polarization.

11. The modulator of claim 10, wherein one of the outer layers has a thickness of approximately $0.0226\lambda$ where $\lambda$ is the wavelength of the incident light; wherein the central layer has a thickness of approximately $0.0710\lambda$; wherein the other of the outer layers has a thickness of approximately $0.1323\lambda$; and wherein the airgap has a thickness of approximately $0.1161\lambda$.

12. A method of fabricating the optical signal modulator of claim 1, comprising the steps of:
providing a substrate;
mounting a support to said substrate;
providing a membrane having a central layer with a first thickness optimized to allow reflection of light incident to said membrane at a non-normal angle of incidence to said membrane when said membrane is unbiased;
mounting said membrane to said support such that said membrane and said substrate define an airgap having a second thickness optimized to allow reflection of light incident to said membrane when said membrane is unbiased;
connecting a bias voltage source to said membrane and said substrate.

13. The method of claim 12, wherein said central layer has a refractive index which is approximately equal to the square root of the refractive index of the substrate.

14. The method of claim 13, wherein said membrane further comprises a pair of outer layers in contact with said central layer, wherein each of said pair of outer layers has a refractive index which is approximately equal to refractive index of the substrate.

15. The method of claim 14, wherein one of said pair of outer layers has a thickness approximately equal to one-quarter of a wavelength of the optical signal; wherein the other of said pair of outer layers has a thickness approximately equal to one-half of a wavelength of the optical signal; and wherein the central layer has a thickness approximately equal to one-quarter of a wavelength of the optical signal.

16. The method of claim 12, wherein said airgap has a thickness of approximately $(\lambda/2)/\cos(\theta)$ when said modulator is biased.

17. The method of claim 14, wherein one of the outer layers has a thickness approximately given as a fraction of the wavelength of the incident light by the formula $1/4+(x-1)5/4$ where x is $1/\cos$(maximum angle of incidence); wherein the central layer has a thickness approximately given as a fraction of the wavelength of the incident light by the formula $1/4-[(x-1)-(x-1)^3]/2$; wherein the other of the outer layers has a thickness approximately given as a fraction of the wavelength of the incident light by the formula $1/2-[(x-1)-(x-1)^5]/4$; and wherein the airgap has a thickness approximately given as a fraction of the wavelength of the incident light by the formula $0.72+(x-1)/4$.

18. The method of claim 14, wherein thicknesses of the pair of outer layers, said central layer, and said airgap are optimized for a maximum angle of incidence of about 85 degrees and TE polarization.

19. The method of claim 18, wherein one of the outer layers has a thickness of approximately $0.0226\lambda$ where $\lambda$ is the wavelength of the incident light; wherein the central layer has a thickness of approximately $0.0710\lambda$; wherein the other of the outer layers has a thickness of approximately $0.1323\lambda$; and wherein the airgap has a thickness of approximately $0.1161\lambda$.

* * * * *